United States Patent [19]
Yamaguchi et al.

[11] 3,810,523
[45] May 14, 1974

[54] SAFETY DEVICE FOR MOTOR VEHICLE

[75] Inventors: Michio Yamaguchi, Yokohama; Yasumasa Kohno, Yokosuka, both of Japan

[73] Assignee: Nissan Motor Company, Limited, Yokohama, Japan

[22] Filed: Jan. 20, 1972

[21] Appl. No.: 219,265

[30] Foreign Application Priority Data
July 23, 1971  Japan.............................. 46-65447

[52] U.S. Cl.......................................... 280/150 AB
[51] Int. Cl............................................. B60r 21/02
[58] Field of Search............................. 280/150 AB

[56] References Cited
UNITED STATES PATENTS

| | | | |
|---|---|---|---|
| 3,511,519 | 5/1970 | Martin.......................... | 280/150 AB |
| 3,250,065 | 2/1968 | Frost ............................ | 280/150 AB |
| 3,602,527 | 8/1971 | Goetz............................ | 280/150 AB |

FOREIGN PATENTS OR APPLICATIONS

| 896,312 | 7/1949 | Germany...................... | 280/150 AB |

Primary Examiner—David Schonberg
Assistant Examiner—Jack D. Rubenstein
Attorney, Agent, or Firm—Robert E. Burns; Emmanuel J. Lobato

[57] ABSTRACT

A safety device for protecting a vehicle occupant from injury during a collision of a motor vehicle which safety device comprises, an inflatable confinement which is normally held in a contracted position, a source of a pressurized fluid capable of communicating with the inflatable confinement to supply the pressurized fluid to the inflatable confinement for thereby inflating the same when the motor vehicle is encountered the collision, a diffusing member operatively disposed in the inflatable confinement and having a plurality of apertures opening in a direction to inflate the inflatable confinement for directing the flow of the pressurized fluid to the inflatable confinement, the diffusing member communicating with the source of pressurized fluid, a mounting base member for supporting the inflatable confinement, and means for defining an exhaust passage opening to the atmosphere. The exhaust passage communicates with the inflatable confinement, whereby when the pressurized fluid is admitted to the inflatable confinement through the plurality of apertures of the diffusing member, the pressurized fluid initially inflates the inflatable confinement and subsequently discharges from the exhaust passage to absorb the impacting force of the vehicle occupant against the confinement.

3 Claims, 4 Drawing Figures

SAFETY DEVICE FOR MOTOR VEHICLE

This invention relates to a safety device for a motor vehicle and more particularly to a safety device for protecting a vehicle occupant from injury during a collision of the vehicle with an obstruction.

A known safety device used in a motor vehicle usually includes an inflatable confinement or protector bag which is normally held in a contracted or folded position. The confinement is located between the vehicle occupant and structural parts of the vehicle such as a windshield, an instrument panel and a steering panel of the motor vehicle whereby when the confinement is inflated as a result of an impact or collision of the motor vehicle, the vehicle occupant is prevented from contacting the structural parts of the vehicle.

In order that the safety device operates reliably, it is desired that the inflatable confinement be expanded and projected to its protective position as soon as possible when a collision is encountered by the motor vehicle. Improvements have heretofore been made on the safety device for instantaneously causing the inflatable confinement to assume the protective position as rapidly as possible. To effect rapid inflation of the confinement, a pressurized gas is utilized as a working fluid which is supplied from an appropriate source of fluid pressure.

In a conventional safety device thus designed, a difficulty is encountered in that, since the confinement is continuously supplied with the pressurized gas during the collision of the motor vehicle, the inflated confinement has a low resilient property with a resultant decrease in absorbing impact force of occupant or occupants upon the latter impacting thereagainst. For this reason, the conventional safety device is unreliable in operation.

It is, therefore, an object of the present invention to provide an improved safety device for a motor vehicle, which device is highly reliable in operation.

Another object of the present invention is to provide an improved safety device for use in a motor vehicle and which is simple in construction and easy to assemble.

A still another object of the present invention is to provide an improved safety device for use in a motor vehicle and which is adapted to initially actuate the inflatable confinement to its protective position and subsequently to release the pressurized fluid in the inflatable confinement thereby to increase the resilient property of the confinement.

In general, these and other objects and advantages of the present invention are achieved in a safety device which is constructed and arranged to increase the cushioning effect of the inflatable confinement for absorbing any impact force of the occupant or occupants thereagainst during a collision of a motor vehicle. The safety device consists of an inflatable confinement which is normally held in a folded position and a source of pressurized fluid capable of communicating with the inflatable confinement to supply the pressurized fluid to the inflatable confinement for inflating the same. Directing means includes a diffusing member operatively disposed in the inflatable confinement. The diffusing member has a plurality of apertures opening in a direction to inflate the inflatable confinement to its protective position. The diffusing member also has a diffusing chamber therein which is in communication with the source of fluid pressure. The inflatable confinement is secured to a mounting base member at its edge portion. The safety device also includes an exhaust passage which communicates with the interior of the inflatable confinement and opens to the atmosphere. With this construction, the pressurized fluid is admitted to the interior of the inflatable confinement to initially effect inflation of the confinement and released therefrom through the exhaust passage to the atmosphere to provide an adequate cushioning effect for absorbing the energy of the occupant or occupants as they impact the inflated confinement. In a preferred embodiment of the present invention, the exhaust passage is formed integral with the mounting base member so as to communicate with the inflatable confinement. In another preferred embodiment, the safety device further includes inner and outer plate members each having an opening which communicates with the interior of the cofinement. The inner and outer plate members are arranged to hold the edge portion of the inflatable confinement therebetween. The inner and outer plate members thus arranged are rigidly connected to the mounting base member in a spaced relationship with each other by means of a plurality of spacers, which form a gap between the outer plate member and the mounting base member to define the exhaust passage for releasing the pressurized fluid from the inflatable confinement. The gap defined between the outer plate member and the mounting base member is in communication with the openings of the inner and outer plate members which in turn are in communication with the interior of the inflatable confinement.

These and other objects and advantages of the present invention will become more apparent from the following description when taken in conjunction with the accompanying drawings, wherein like reference numerals are used to designate like or corresponding component parts throughout the several views, and in which.

Figure 1:
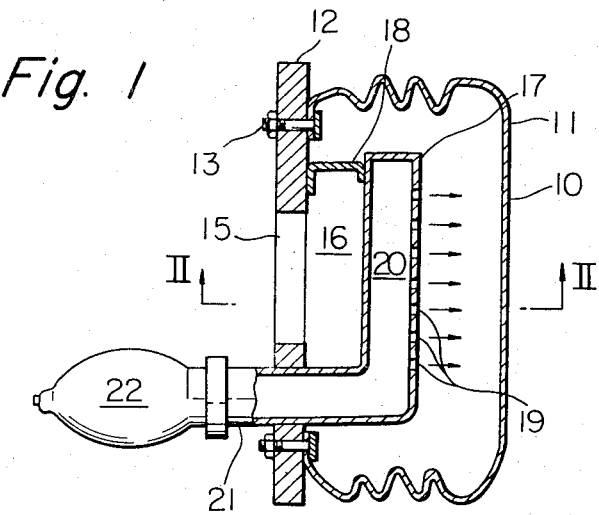
FIG. 1 is a sectional view of a first embodiment of a safety device according to the present invention.
Figure 2:
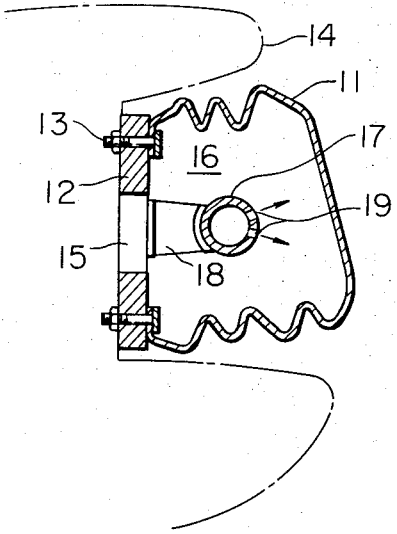
FIG. 2 is a sectional view taken on line II–II of FIG. 1.

Referring now to the drawings, and more particularly, to FIGS. 1 and 2, a preferred embodiment of the safety device according to the present invention is shown in section, which device is generally designated by reference numeral 10. As shown, the safety device 10 includes an inflatable confinement 11 which is normally held in a contracted or folded position, though not shown. The inflatable confinement 11 is secured to a surface of a mounting base member 12 by a known suitable fastener means, such as bolts and nuts 13. The mounting base member 12 may be mounted on a suitable support structure of the motor vehicle, for example, on an instrument panel 14 which is shown in phantom line in FIG. 2.

The safety device 10 also includes an exhaust passage 15 in communication with the interior 16 of the inflatable confinement for releasing the pressurized fluid therefrom upon complete inflation at the confinement 11. In the illustrated embodiment of FIGS. 1 and 2, the exhaust passage 15 is shown as integrally formed with the mounting base member 12 but may be defined by other common parts as will be hereinafter discussed in detail.

In FIGS. 1 and 2, an exhaust passage 15 communicates with the interior 16 of the inflatable confinement 11 and opens to the atmosphere. It may be noted that the effective sectional area of the exhaust passage 15 may be so sized as to absorb the energy of the occupant or occupants impacting against the inflatable confinement during the collision of the motor vehicle in the most effective fashion. For example, where the usual inflatable confinement is used in the safety device, the effective sectional area of the exhaust passage 15 may be in range between 50 to 150mm in diameter.

A diffusing member, generally indicated at 17, is operatively disposed in the interior 16 of the inflatable confinement 11. The diffusing member 17 may be made from any suitable material and supported by a supporting arm 18 fixedly connected to the mounting base member 12, in such a manner as to maintain the inflatable confinement 11 in a readily inflatable position. As best shown in FIG. 2, the diffusing member 17 is herein shown as circular in shape and is provided with a plurality of radially or laterally extending apertures 19 which opens in a direction to inflate the confinement 11. The diffusing member 17 has a diffusing chamber 20 therein which communicates with a duct 21, which in turn communicates with a source 22 of pressurized fluid such as pressurized gas generating means of known construction. As seen from FIG. 1, the duct 21 is supported by the base member 12 and fixedly connected thereto.

When a collision is encountered by the motor vehicle, a triggering means (not shown) is energized to actuate the source of pressurized fluid so that the pressurized fluid is admitted through the duct 21 to the diffusing chamber 20. The pressurized fluid thus admitted to the diffusing chamber 20 is passed through the plurality of apertures 19 to the interior 16 of the inflatable confinement 11 to actuate the same in its protective position. It will be appreciated that since the apertures 19 open to a direction opposite to the exhaust passage 15, the inflatable confinement 11 is caused to continuously inflate in its protective position by the fluid under pressure supplied through the apertures 19 of the diffusing member 17 until the confinement 11 is completely inflated. When, however, the vehicle occupant impacts against the inflated confinement 11 in the event that the confinement 11 is completely inflated during the collision of the motor vehicle, the pressure prevailing in the inflatable confinement 11 increases and thus the pressurized fluid in the inflatable confinement 11 is released therefrom through the exhaust passage 15 provided in the mounting base member 12. The resilient property of the confinement 11 is accordingly increased so that the energy of the occupant is absorbed in a satisfactory manner to prevent injury to the occupant.

Figure 3:
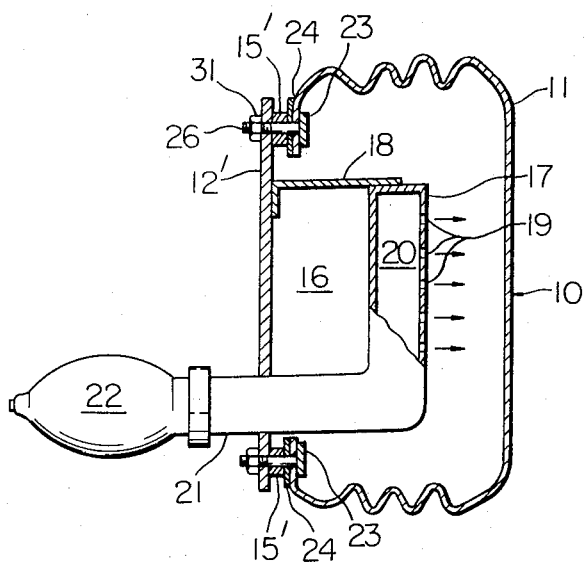
FIG. 3 is a sectional view of a second embodiment of the safety device according to the present invention.
Figure 4:
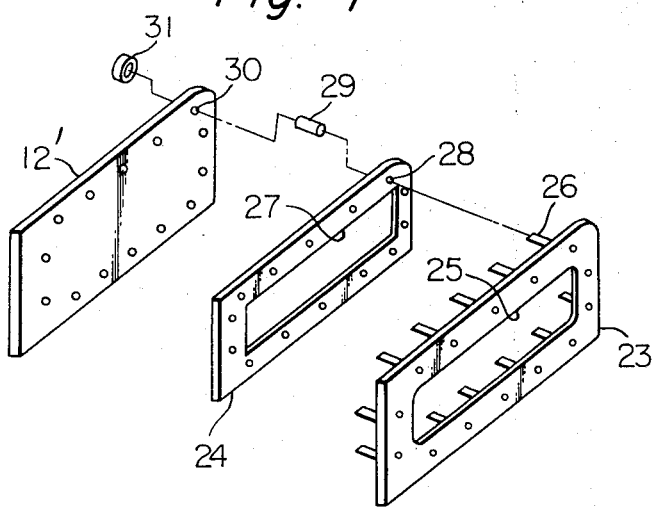
FIG. 4 is a perspective disassembled view of the mounting member of the safety device of FIG. 3.

FIGS. 3 and 4 illustrate another preferred embodiment of the safety device according to the present invention. In this illustrated embodiment, the safety device 10 further includes inner and outer plate members 23 and 24, between which the edge portion of the confinement 11 is located and fixedly supported thereby. As best seen from FIG. 4, the inner plate member 23 is formed with an opening 25 which is in communication with the interior 16 of the inflatable confinement 11. The inner plate member 23 is also provided with a plurality of fastener means such as bolts 26 in a suitable location of the inner plate member 23.

Likewise, the outer plate member 24 has an opening 27 which may be aligned with the opening 25 of the inner plate member 23. The outer plate member 24 is also provided with a plurality of apertures 28 therethrough corresponding in number to the bolts 26 fixed to the inner plate member 23.

The bolts 26 are inserted into the corresponding apertures 28 of the outer plate member 24 and thereafter the assembled inner plate 23, the inflatable confinement 11 and the outer plate member 24 are maintained in a spaced relationship with respect to the mounting base member 12' by means of a plurality of spacers 29, only one of which is shown in FIG. 4 for the sake of simplicity of illustration. As is best shown in FIG. 4, the mounting base member 12' has a plurality of apertures 30 at a suitable position, which apertures 30 is aligned with the apertures 28 of the outer plate member 24 to receive the bolts 26 fixed to the inner plate member 23. When assembling, the bolts 26 are engaged with a plurality of nuts 31 (one of which is shown in FIG. 4) so that the inner and outer plate members 23 and 24 and accordingly the inflatable confinement 11 are fixedly mounted on the mounting base member 12'.

It should be appreciated that the outer plate member 24 and the mounting base member 12' are spaced from each other by the spacers 29 to provide a gap therebetween for defining the exhaust passage 15'. The exhaust passage 15' is in communication with the openings 27 and 25 of the inner and outer plate members 23 and 24, which openings 27 and 25 are in communication with the interior 16 of the confinement 11. With this arrangement, the pressurized fluid in the confinement 11 is released therefrom through the openings 25 and 27 and through the exhaust passage 15' defined between the outer plate member 24 and the mounting base member 12'.

It should be noted that the other constructions and operation of the safety device 10 shown in FIGS. 3 and 4 are similar to those of FIGS. 1 and 2 and, therefore, the detailed description of the same is herein omitted.

It will now be appreciated that the safety device according to the present invention is highly reliable in operation because the safety device is arranged to release a pressurized fluid in the inflatable confinement through an exhaust passage when a vehicle occupant or occupants impacts against the confinement.

It will also be understood that the safety device implementing the present invention permits the use of minimum number of component parts to provide a compact and simplified construction for thereby providing low production cost.

What is claimed is:

1. A safety device for protecting a vehicle occupant from injury during a collision of a motor vehicle comprising, in combination, an inflatable confinement having an open end portion and having a normally contracted position, a source of pressurized fluid in communication with said inflatable confinement for supplying said pressurized fluid to said inflatable confinement to inflate same when the motor vehicle is in a collision, a mounting base member for supporting said inflatable confinement and fixed to the motor vehicle, a diffusing member disposed in said inflatable confinement and having a plurality of apertures in communication with said source of pressurized fluid and opening in a direction operative to direct said fluid away from said mounting base member, a supporting arm fixedly connected to said mounting base member and supporting said diffusing member in said inflatable confinement, inner and outer plate members securing therebetween the open end portion of said inflatable confinement, each plate member having means defining openings therein in communication with said inflatable confinement, and a plurality of spacers disposed between said outer plate member and said mounting base member to define therebetween an exhaust passage for releasing the pressurized fluid in said inflatable confinement.

2. Safety apparatus for protecting an occupant of a vehicle comprising: an expandable confinement having an open end portion and having a normally contracted state and an expanded state; means for supplying fluid to expand said confinement; and means responsive to forces applied externally to said confinement whenever same is in said expanded state for venting fluid from within said confinement to absorb the forces, said last-mentioned means comprising a support member, and means connecting said open end portion of said confinement to said support member and spaced therefrom to define therebetween a fluid passage from said confinement to the atmosphere, said means connecting comprising inner and outer plate members connected together with said open end portion of said confinement disposed therebetween and each plate member having means therein defining at least one aperture in communication with said confinement and a plurality of spacing members connected to and disposed between said outer plate member and said support member.

3. Safety apparatus according to claim 2, wherein said means for supplying fluid comprises directing means disposed within said confinement for directing said fluid in substantially one direction away from said support member.

* * * * *